(No Model.) 6 Sheets—Sheet 4.
C. W. WEISS.
CASH REGISTER, INDICATOR, AND CHECK PRINTER.

No. 524,814. Patented Aug. 21, 1894.

Attest:
A. N. Jesbera
A. Hidder

Inventor:
Carl W. Weiss
by William B. Greeley
Att'y

Fig. 5.

(No Model.)  C. W. WEISS.  6 Sheets—Sheet 6.
CASH REGISTER, INDICATOR, AND CHECK PRINTER.
No. 524,814.  Patented Aug. 21, 1894.

UNITED STATES PATENT OFFICE.

CARL W. WEISS, OF BROOKLYN, NEW YORK, ASSIGNOR, BY MESNE ASSIGNMENTS, TO THE NATIONAL CASH REGISTER COMPANY, OF OHIO.

CASH REGISTER, INDICATOR, AND CHECK-PRINTER.

SPECIFICATION forming part of Letters Patent No. 524,814, dated August 21, 1894.

Application filed April 20, 1892. Serial No. 429,903. (No model.)

*To all whom it may concern:*

Be it known that I, CARL W. WEISS, of Brooklyn, in the county of Kings and State of New York, have invented certain new and useful Improvements in Cash-Registers; and I do hereby declare that the following is a full and exact description thereof, reference being had to the accompanying drawings, and to the letters and figures of reference marked thereon, making a part of this specification.

The general object of my present invention is to produce a cash register which may be caused to indicate any desired amount of one or more figures, by the operation of a single set of ten keys without the co-operation of a crank or any other motor independent of the keys.

The various features of my invention are described herein as more or less subordinate and contributory to this general object but it will be readily understood that many of them are equally applicable to registers or indicating machines of other and different types.

Figure 1:
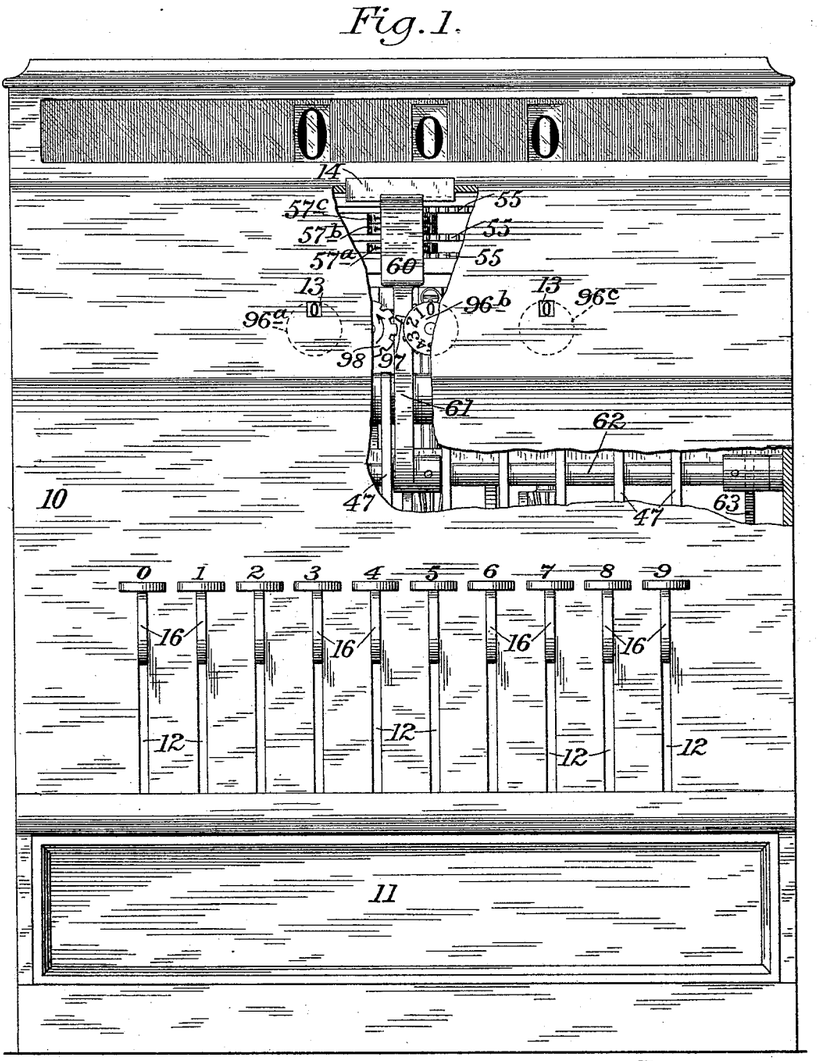
Figure 1 is a front view of a convenient form of the improved register, the front casing being broken out to show a part of the mechanism behind it.

The various parts of the mechanism may be supported by an independent frame-work, or, as shown in the drawings, by the casing 10, in the lower portion of which a drawer 11 may be fitted to slide in and out. Above the drawer the front of the casing is slotted, as at 12, in Figs. 1 and 4, to permit the proper movement of the stems of the keys. It may also be provided with sight openings 13, through which the amount indicated by the adding wheels may be read. At the proper point with relation to the typewheels it is slotted, as at 14 to permit the insertion and withdrawal of the check upon which the amount of each sale is printed. The upper part of the casing may be formed to receive a glass plate or plates through which the indicators may be read.

Extending longitudinally of the register and suitably journaled in the casing is a shaft 15 which serves mainly as the pivot shaft of the keys and of various other parts of the mechanism. As it may also be used as a convenient intermediary to transmit movement from one part of the mechanism to another it is made capable of rotation, but it is not the actuator or source of motion for any of the parts of the register.

Figure 2:
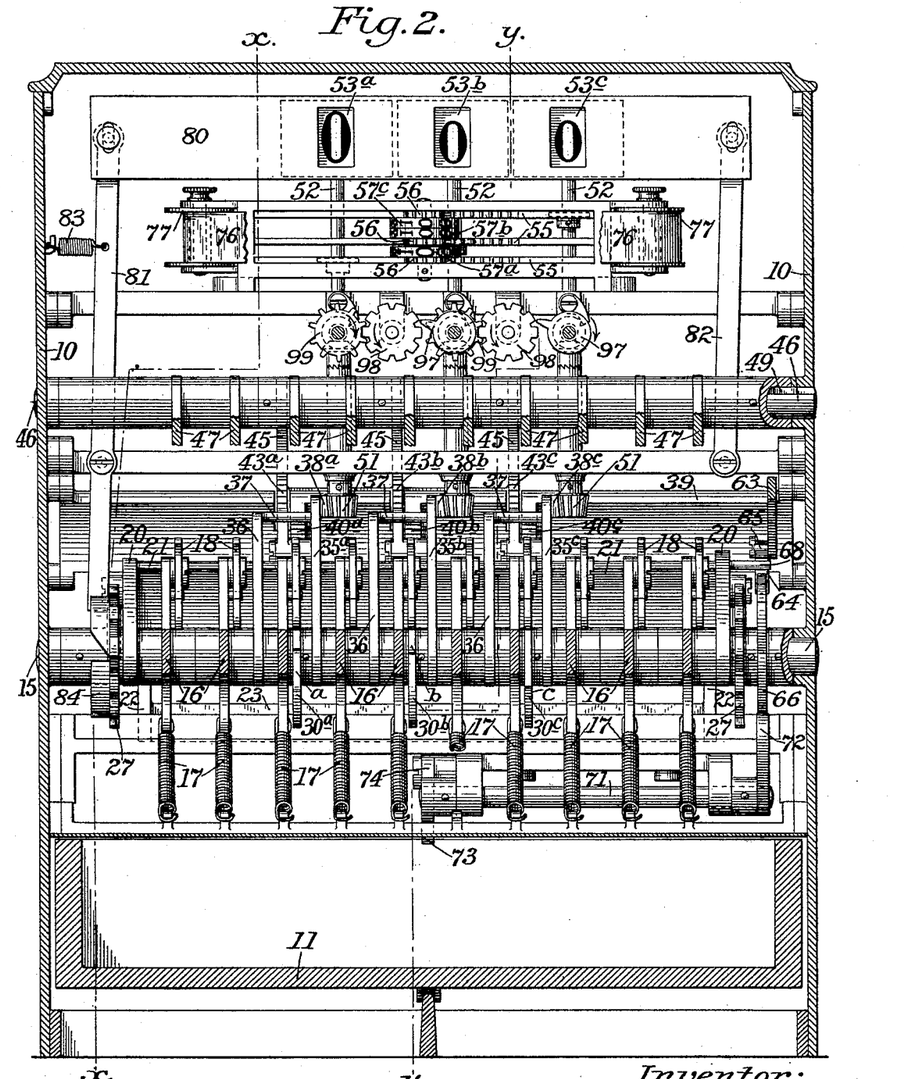
Fig. 2 is a longitudinal section of the register on the line *t—t* of Fig. 3, showing most of the mechanism in front elevation.
Figures 3, 9:
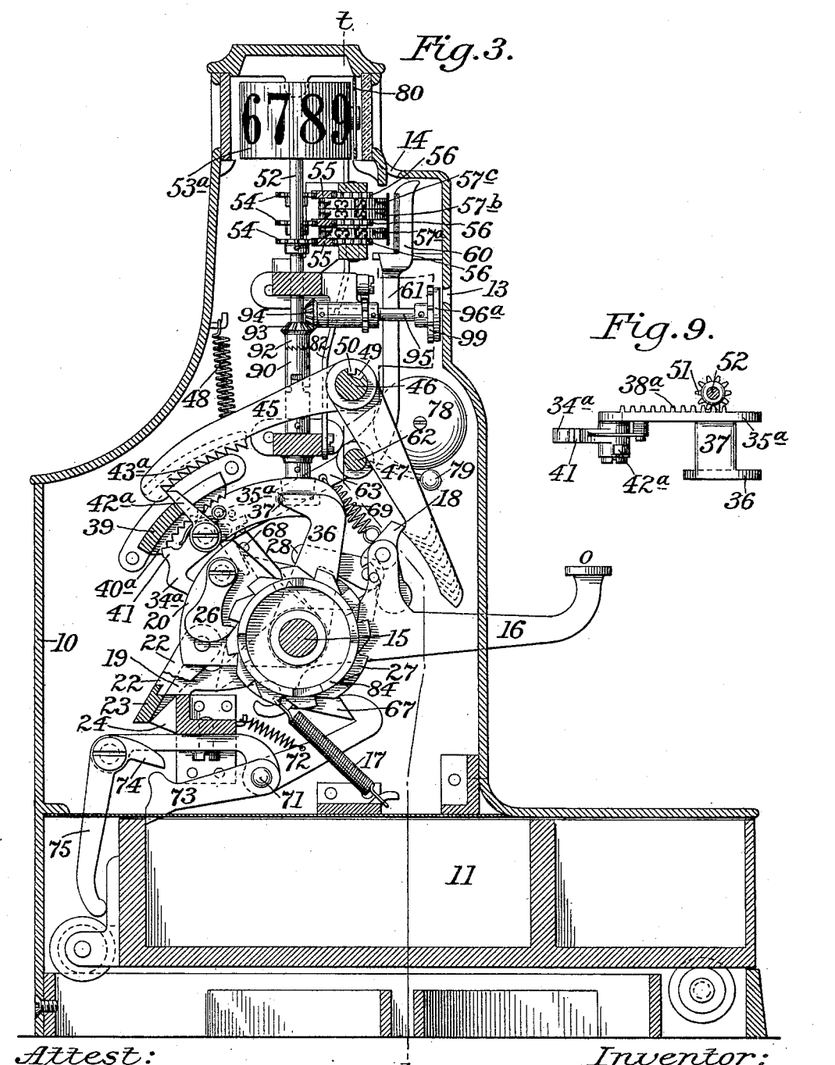
Fig. 3 is a transverse section on the line *x—x* of Fig. 2.
Fig. 9 is a detail view showing the dog and lifting finger which form a part of the coupling devices; and the rack and pinion forming part of the indicating mechanism.
Figures 4, 8:
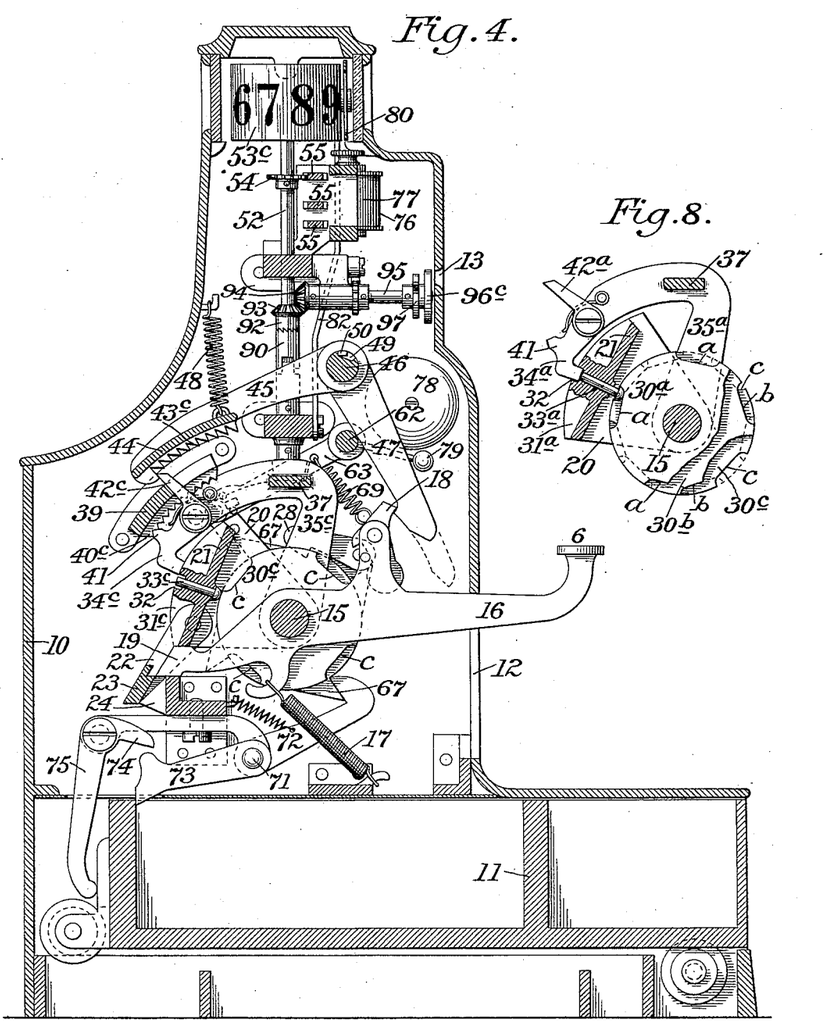
Fig. 4 is a transverse section on the line *y—y* of Fig. 2.
Fig. 8 is a detail view illustrating the relation of parts of the device which controls the coupling of the several indicators to their actuator.

The keys 16, 16, which are suitably formed to be operated by the fingers of the operator and are numbered from 0 to 9, inclusive, are severally pivoted upon the shaft and are severally adapted to be returned to position, after operation, by springs 17 (see Figs. 2, 3 and 4). Each key has pivoted thereon a dog 18 and each is formed with an extension 19 which, when the key is in normal position, rests upon a stop-bar parallel with the shaft. As shown, the keys have a definite and equal range of movement, and constitute the motor from which the other parts of the mechanism derive their motion.

Pivoted upon the shaft near its ends are two segmental plates 20, 20, (see Fig. 2, 3, 4 and 5) which are united by a longitudinal web 21 to form a yoke or swinging frame. In normal position the lower edge of the web rests upon the extensions 19 of the keys so that the frame is swung upward whenever any key is operated.

To the swinging frame is pivoted a pawl in the form of a yoke composed of arms 22, 22, and a longitudinal bar 23 which, when the parts are in normal position, is held just clear of the ends of the keys by an incline or cam 24. As the frame is swung up by a key the yoke-pawl swings under the end of the key which is operated, so that the swinging frame is coupled to the key and so that as the key is restored to position by its spring it will at the same time, through the yoke, draw down the swinging frame into its normal position. As the yoke reaches its lowest position it will be swung clear of the key by the cam in readiness for similar action when another key is operated. The swinging frame is thus essentially a movable part of the mechanism which may or may not be independent of the keys but to which motion is imparted by the operation of any one of the keys and through the indicators are operated by the keys yet as they are coupled directly to the frame, as hereinafter described, it may be considered in effect the actuator for the indicators.

Figure 6:
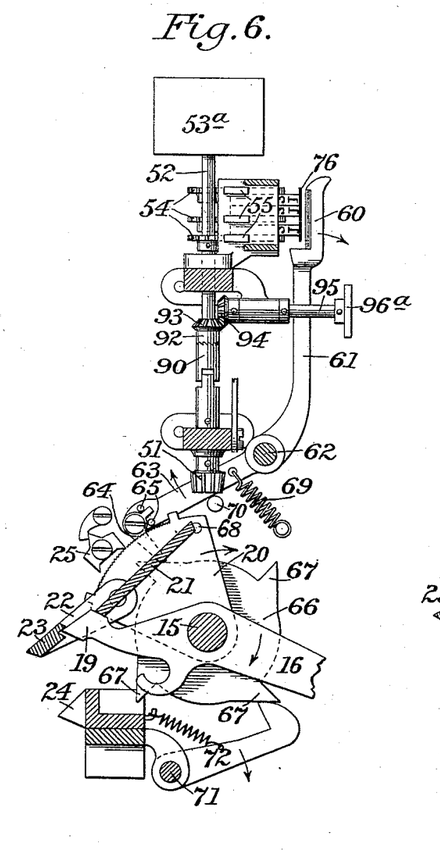
Figs. 6 and 7 are detail views in transverse section, showing particularly the printing mechanism which is represented in different positions in the two views.
Figure 7:
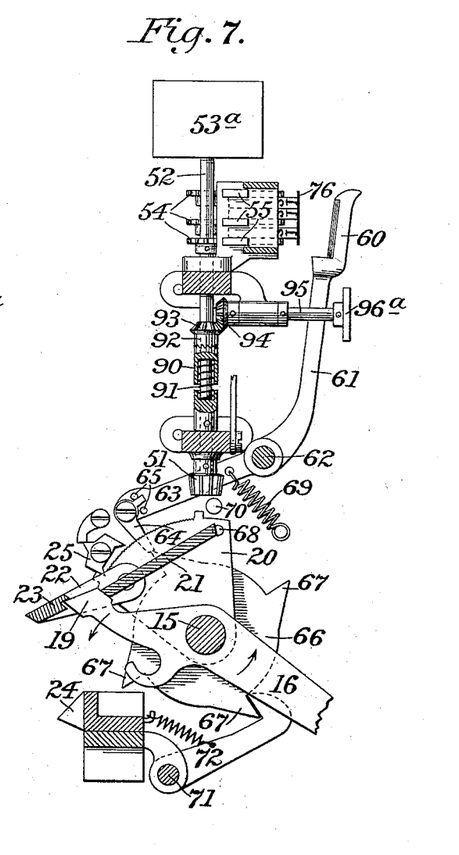

As shown clearly in Figs. 6 and 7, a double-toothed pawl 25, pivoted upon a fixed part, co-operates with the serrated edge of one of the segmental plates in a well known manner to prevent anything less than a full movement of the swinging frame in either direction.

Figure 5:
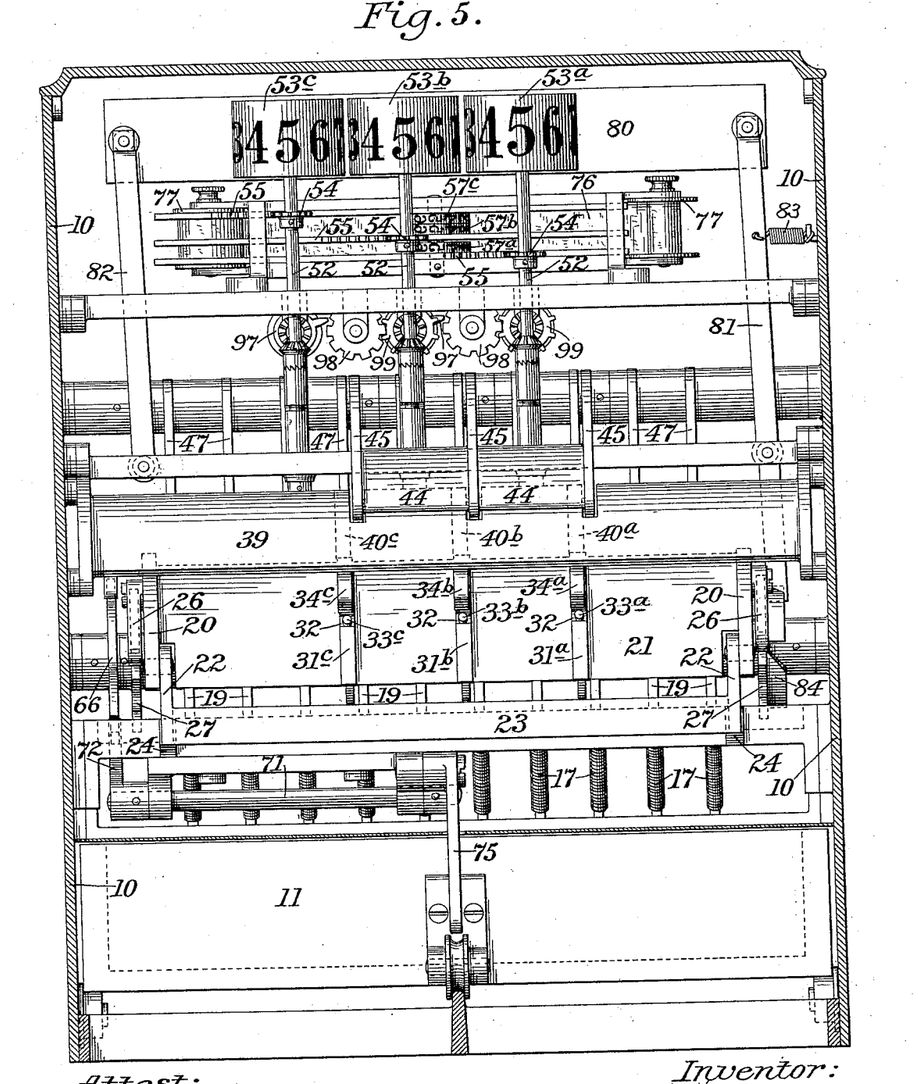
Fig. 5 is a rear elevation of the register with the casing in section.

Upon one or both of the plates 20 is pivoted a pawl 26 which is adapted to engage the teeth of a ratchet-wheel 27 fixed upon the shaft 15 (see Figs. 2, 3 and 5). I may give the wheel twelve teeth and so arrange the pawl with reference thereto, by providing for lost motion, if necessary, that the shaft shall be advanced one step, or through one-twelfth of a rotation, by each complete movement of a key. A hold pawl 28 may also engage said wheel to prevent backward movement of the shaft.

Upon the shaft 15 are fixed a number of cam disks corresponding to the number of denominations the register is intended to be capable of indicating. The register illustrated is intended to indicate dollars, dimes and cents and I have therefore shown three such disks $30^a$, $30^b$, $30^c$, (Figs. 2, 4 and 8.) Each disk is provided with a series of peripheral recesses $a, a, b, b,$ and $c, c,$ for a purpose presently to be described. The transverse web 21 of the swinging frame bears three ribs $31^a$, $31^b$, $31^c$, curved upon the axis of the shaft 15 as a center and in alignment respectively with the disks just mentioned. Each rib is notched as at 32, (see Figs. 4 and 5) and is also perforated in line with the notch to receive a sliding pin $33^a$, $33^b$, $33^c$, one end of which rests normally upon the periphery of the respective disk while the other end substantially fills the notch to prevent the dropping of a dog $34^a$, $34^b$ or $34^c$, thereinto as hereinafter set forth.

The sole function of the recessed disk and the sliding pin being to prevent or permit the coupling of the indicating mechanism, of which the dog forms a part, to the actuator, the said disk and pin obviously might be replaced by a cam disk and pawl or by any other equivalent device which may constitute, as does the device shown, a coupling controller. The three pins $33^a$, $33^b$, $33^c$, being preferably set in a line parallel with the shaft 15, the three disks $30^a$, $30^b$, and $30^c$ are fixed upon the shaft in such relation that their peripheral recesses are stepped one after another. That is to say, they are so placed with respect to each other and to the pins $33^a$, $33^b$, $33^c$, that when the shaft 15 is advanced one step by the operation of one key 16 acting through the swinging frame 20, 21, the pawl 26 and the ratchet-wheel 27, one disk $30^a$ will be moved into such position with respect to its respective pin $33^a$ as to bring a recess $a$ in line with the pin and so permit the dog $34^a$ before mentioned to push in the pin and enter the notch 32 in the segmental rib $31^a$; the advance of the shaft one step farther will cause the first disk $30^a$ to throw its pin $33^a$ out (the end of the recess $a$, being inclined for this purpose) and the second disk $30^b$ to bring a recess $b$ in line with its respective pin $33^b$ for a similar purpose, while a still further advance of the shaft will cause the third disk $30^c$ to bring a recess $c$ in line with its respective pin $33^c$. In the register shown these three movements will complete the cycle of operations of the shaft and the next movement will bring another recess $a$ on the first disk $30^a$ into line with the first pin $33^a$ and will thereby commence another cycle of operations.

The devices just described afford a convenient means for automatically coupling the different indicators in succession to a single set of keys, but as I am the first to accomplish this general result I wish it to be understood that my invention is not restricted to the particular form of devices shown. Neither do I intend to limit my invention to any particular form of indicators or indicating devices and therefore, although I have shown a wheel bearing the figures from 0 to 9 about its periphery together with means for rotating said wheel as constituting a convenient form of indicator, it is to be understood that the term "indicator," as used in my broader claims, has a wider significance and includes any of the well known devices which are employed to exhibit a particular figure or character of a series.

The means by which the movements of the dogs $34^a$, $34^b$, $34^c$, are transmitted to their respective indicators, as shown in the drawings, will now be described. Upon the shaft 15 are loosely mounted three arms $35^a$, $35^b$, $35^c$, corresponding to the several disks $30^a$, $30^b$, $30^c$. As there is, in the construction shown, some lateral thrust upon the outer portions of the arms, I prefer to provide for each arm a second or supporting arm 36 and to connect the two by a transverse bar 37. Each arm $35^a$, $35^b$, $35^c$, is bent, as shown and upon one side of its segmental portion is provided with a rack $38^a$, $38^b$ or $38^c$, as shown in Figs. 2 and 9.

The extremity of the segmental portion has pivoted thereon the dog $34^a$, $34^b$ or $34^c$ hereinbefore referred to as adapted to engage the notch 32 in the segmental rib $31^a$, $31^b$ or $31^c$. A fixed segmental plate 39 (see Figs. 2, 3, 4 and 5) overlies the dogs $34^a$, $34^b$, $34^c$ and bears in line with each a serrated rib $40^a$, $40^b$, $40^c$, which may be engaged by a tooth 41 on the back of the dog when the latter is out of the notch 32 in the movable rib $31^a$, $31^b$ or $31^c$. A lifting finger $42^a$, $42^b$, $42^c$ is fixed to each dog, as by a sleeve, (see Fig. 9) and is adapted, when turned upon the common pivot, to raise the dog out of the notch 32 against the stress of a spring which bears on the dog. A shaft 46, (see particularly Figs. 3 and 4) which is mounted to oscillate in bearings has fixed thereto arms 45 which are connected to move together by a web 44.

Toothed ribs or racks $43^a$, $43^b$, $43^c$ are fixed or formed upon the under side of the web 44, or of the arms, in line respectively with the path of movement of the lifting fingers $42^a$, $42^b$, $42^c$, and approximate thereto. The shaft 46 also bears a graduated series of fingers 47 corresponding to the series of keys 16 and respectively in the same plane with the dogs 18 which are pivoted on the keys.

In the normal position of the mechanism the dogs occupy positions with respect to the fingers as shown in Figs. 3 and 4. If then any key 16 be depressed its dog 18 yields until it has passed below the end of its respective finger 47. The dog 18 being then brought to position by its weighted lower end and held against further movement on its pivot in the opposite direction, its upper end will strike the lower end of the finger 47, as the key moves upward under the influence of its spring 17, and thrust the end of the finger 47 outward, thereby rocking the shaft 46 and throwing the racks $43^a$, $43^b$, $43^c$ downward against the stress of the supporting spring 48 so that they shall engage the lifting fingers $42^a$, $42^b$, $42^c$ in their movement with the arms $35^a$, $35^b$, $35^c$ to which they are pivoted and thereby swing the dogs $34^a$, $34^b$, $34^c$ on their pivots and lift such as may be in engagement with the notches 42 out of them. The effect of this operation is to uncouple the racks $38^a$, $38^b$, $38^c$, through which the indicators and adding and printing devices are moved from their actuator.

The several fingers 47 of the series are graduated in length so that, as all the keys 16 have a definite and equal range of motion, each key determines the proper movement of the indicator to exhibit the figure corresponding to the value of the key, besides being the motor, in the machine shown, for the actuator. Thus the finger 47 corresponding to the 0-key is the longest and is engaged by the dog 18 on the key just as the latter commences its upward movement and causes the first tooth of one of the toothed ribs $43^a$, $43^b$, $43^c$ to engage the lifting finger of the moving arm $35^a$, $35^b$ or $35^c$, thereby uncoupling the arm before the corresponding indicator is moved and leaving the 0 exposed at the sight opening. The finger 47 corresponding to the 4-key is of such length that it is struck by the dog 18 on the key 16 just before the moving lifting-finger reaches the line of the fifth tooth on the respective ribs and at that instant moves the ribs so that the fifth tooth of the proper rib shall engage the moving lifting-finger and uncouple the moving arm from the swinging frame, leaving the indicator in position with the figure 4 at the sight opening.

The fingers 47 might be fixed to the shaft but as in that case all of the fingers 47 must be moved whenever any one key is operated I prefer to provide for lost motion between the shaft 46 and the fingers 47. Accordingly I slot the shaft longitudinally, as at 49, and fix to each finger 47 a projection 50 of less width than the slot 49. As seen in Figs. 3 and 4 the fingers 47 rest against a cross shaft or rod with their projections against the rear side of the slot. The movement of any one of the fingers in the manner described will therefore rock the shaft 46, but the movement of the shaft will not affect the other fingers 47 of the series.

It is obvious that the dog 18 might be pivoted to the finger instead of the key, this arrangement being a mere reversal of that shown.

I have above referred to the engagement of the toothed rib $43^a$, $43^b$ or $43^c$ with the lifting-finger $42^a$, $42^b$, or $42^c$ as causing the movement of the latter to raise the dog $34^a$, $34^b$ or $34^c$, but it will be understood that each toothed rib forms a series of stops for the free end of the lifting-finger and that the continued movement of the arm $35^a$, $35^b$ or $35^c$ with the lifting finger will cause the latter to be swung on its pivot until the dog $34^a$, $34^b$ or $34^c$ is lifted from the notch 32 in the ridge $31^a$, $31^b$ or $31^c$, thereby stopping the further movement of the arm and at the same time bringing the tooth 41 on the head of the dog into engagement with the locking rack $40^a$, $40^b$ or $40^c$.

In the foregoing description I have assumed that the several indicators were in the outset all at 0 and that the arms $35^a$, $35^b$, $35^c$, bearing the dogs $34^a$, $34^b$, $34^c$, and lifting-fingers $42^a$, $42^b$, $42^c$, were all in their extreme forward positions, but as it generally happens that the indicators are left by the last previous operation of the register at some other figure than 0 and the arms at some position between their extreme forward position and the position shown in Figs. 3 and 4 it is necessary that the indicators shall be reset to 0 and the arms brought into their extreme forward position before new values are registered. This is effected during the downward movement of the keys 16, for as the notch 32 in each rib $31^a$, $31^b$, $31^c$, starts from its lowest position at each operation it will, when the pin $33^a$, $33^b$ or $33^c$ is released by a recess in the disk, $30^a$, $30^b$ or $30^c$, be engaged by the dog $34^a$, $34^b$ or $34^c$ at whatever point the latter may be standing and will carry the same, together with the arm $35^a$, $35^b$ or $35^c$ and connected parts, into their extreme forward position.

When indicator wheels mounted upon vertical shafts are employed, as shown in the drawings, each rack $38^a$, $38^b$, $38^c$, meshes with a bevel pinion 51 fixed to the shaft 52 which carries the indicator 53ª, 53ᵇ or 53ᶜ. Each indicator shaft 52 may also be adapted to actuate its respective print-wheel to bring to the line of print the same figure which is exposed by the indicator. To this end I have provided each shaft 52 with a pinion 54 which meshes with a rack-bar 55 which slides freely in suitable supports. Each rack-bar 55 in turn engages a pinion 56 fixed to its respective print-wheel 57ª, 57ᵇ or 57ᶜ, the several print-wheels being mounted upon a common axis.

The print-hammer or platen 60, which may be formed to support the check inserted for imprint, is supported opposite the print-wheels by an arm 61 which is fixed to a rock-shaft 62. The hammer must be actuated, not after each operation of a key 16, but, in the register shown, at every third operation or after all the print-wheels have been set and have come to rest. The mechanism for this purpose may be varied widely but I have shown in the drawings a convenient form. The print-hammer being carried by a somewhat elastic arm 61 fixed upon the shaft 62, a second arm 63 (see particularly Figs. 6 and 7) is fixed upon the same shaft 62 and bears a pivoted dog 64, the movement of which is limited by stops 65. The dog 64 is in the plane of a disk 66 which is fixed to the shaft 15 and has, in the register shown, four cam teeth 67, or one for every three teeth of the ratchet-wheel 27 which is also fixed to the same shaft 15. As the shaft 15 is moved forward for the third time by the depression of one of the keys 16, one of the cam teeth 67 on the disk 66 strikes the dog 64, as shown in Fig. 6, and gradually moves the hammer 60, through the arms, 63 and 61 and the shaft 62, into the position shown in Fig. 7 which position is reached as the key 16 reaches the limit of its downward movement.

When the key is released and is returned by the spring 17 to its normal position, together with the swinging-frame 20, 21 through the engagement of the extension 14 of the key with the yoke 22, 23, a pin 68 carried by one of the segmental plates 20 of the swinging frame, just before it reaches its normal position, strikes the dog 64 and knocks it from the point of the cam tooth 67 on which it rested and permits the hammer 60 to be thrown sharply toward the print-wheels by a spring 69 which is attached to the arm 63 and to a fixed part of the frame or casing. The resilience of the arm 61 being overcome by the momentum of the hammer, the latter strikes the print-wheels or the interposed check smartly and immediately springs free of the wheels. A fixed stop 70 in the path of the arm 63 prevents the hammer from being thrown too far by the spring 69.

An inking-ribbon 76, carried by spools 77 in the usual manner, may be interposed between the hammer and the print-wheels. An alarm bell 78 may be supported upon the casing to be struck by a hammer 79 carried by the shaft 62 at the same time that the print-hammer 60 is operated. The bell-hammer might also be operated by the devices hereinafter described for unlocking the drawer. In either case the bell is struck only at the close of a complete operation of the register.

It is obvious that the cash drawer 11 should be thrown out, not at each operation of a key 16, but at the end of the cycle of operations. Here also, for reasons similar to those above noted, my invention covers broadly the means for effecting the release of the drawer at the close of a series of operations of a single set of keys. As shown in the drawings (see Figs. 3, 4, 5 and 6) the cam-toothed disk 66 is utilized for this purpose. A shaft 71 supported in bearings above the drawer 11 has fixed thereto one arm 72 in the plane of and below the disk 66 and another arm or latch 73 which, in normal position, engages and locks the drawer 11. The two arms might be formed in one piece and be pivoted upon a stud fixed at one side of the casing, but as it is desirable that the drawer should be locked in the middle I prefer the arrangement shown. The arm 72 is so placed and formed that at the end of the cycle of operations one of the teeth 67 on the disk 66 shall strike the arm 72, as shown in Fig. 6, and move it to lift the other arm 73 and release the drawer. At the same time the arm 73 may strike one arm 74 of an elbow lever and so cause the other arm 75 of the lever, which stands in the rear of the drawer, to push the drawer out slightly.

The shutter, which is commonly used to conceal the indications from the operator while he is manipulating the register, must be moved to cover the indicators as the first operation of the cycle is commenced and to uncover them at the close of the last operation of the cycle. I have shown in the drawings a convenient mechanism for effecting the proper movement of the shutter. The shutter itself, in the present instance, consists of a plate 80, Fig. 2 which has openings corresponding to the several indicators and is supported by pivoted arms 81, 82. A spring 83 normally holds the plate 80 in such position as to expose the indicators. One of the arms 81 is extended below its pivot point and a laterally notched flange 84, which may be formed upon the side of the ratchet-wheel 27, co-operates with the lower end of such arm to effect the desired movements of the shutter. The notches of the flange are so placed that when the operative parts of the register are in normal position the lower end of the arm 81 stands in one of the notches. With the beginning of the first operation of a key 16 the inclined side of the notch moves the arm against the stress of the spring 83 and causes the shutter 80 to conceal the indicators. During the remainder of the operation and until the close of the third or last operation of the cycle the end of the arm rides upon the edge of the flange 84, but just at the close of the last movement of the shaft another notch is presented and the end of the arm 81 is drawn into it by the spring 83 and the shutter is moved to uncover the indicators.

The adding wheels are adapted to be actuated severally, each of the three lower denominations by its respective indicator mechanism independently of the wheels of lower denominations, and each to be advanced one space by each complete rotation of the wheel of the next lower denomination. Each indicator shaft 52 carries a sleeve 90 which oscillates with the shaft while being free to move longitudinally thereon to a limited extent, being pressed upward by a weak spring 91. The upper end of the sleeve is formed with inclined teeth which, during the forward movement of the shaft, engage oppositely inclined teeth on the lower end of a sleeve 92, which is loose on the shaft 52, and rotate said sleeve in a forward direction and to an extent corresponding to the forward movement of the shaft and to the value of the figure exposed by the indicator. The sleeve 92 carries a bevel gear 93 which meshes with a second bevel gear 94, of equal size, upon the end of a short shaft 95 which carries the adding wheel $96^a$, $96^b$ or $96^c$ of the respective denomination.

The adding train is of usual construction and arrangement but may be described briefly. The shaft 95 of the cent wheel carries a single-toothed wheel 97 which at each rotation advances an intermediate ten-toothed gear 98 one space. This intermediate gear meshes with another ten-toothed gear 99 on the shaft 95 of the dime wheel. The latter shaft also carries a single-toothed wheel 97 which, through a similar arrangement of gears, advances the dollar wheel one space at each rotation. In practice other adding wheels of higher denominations may be driven from the dollar wheel.

To explain the operation of the register let it be supposed that a sale of the value of $5.25 is to be registered. The last previous operation of the register left the shaft 15 in such position that a recess $a$ in the first disk $30^a$ is in the line of the pin $33^a$ in the rib $31^a$. The depression of the 5-key now swings upward the swinging frame 20, 21 and, through the pawl 26 and the ratchet-wheel 27, advances the shaft 15 one step. As the frame moves upward and the notch 32 in the rib $31^a$ reaches the dog $34^a$ in whatever position it may have been left by the last operation, the dog drops into the notch and consequently causes the arm $35^a$ to swing to its extreme position and, through the rack $38^a$ and pinion 51, the indicator $53^a$ to be rotated backward to its 0-position. During this movement the dog 18 on the key 16 yields as it passes the finger 47. As soon as the key has been depressed to its limit and released, the spring 17 restores it to its normal position and, through the engagement of the key with the yoke 22, 23, also returns the swinging frame to its normal position leaving the shaft in its new position with a recess $b$ in the second disk $30^b$ in line with the pin $33^b$. In the upward movement of the key 16 the dog 18 thereon strikes the graduated end of the corresponding finger 47 and throws the rack or toothed ribs down at such a time that the sixth tooth of the rib $43^a$ engages the end of the lifting-finger $42^a$ and causes the dog $34^a$ to be lifted out of the notch 32, thereby stopping the movement of the arm $35^a$ and rack $38^a$ and checking the dollar indicator with the figure 5 at the sight opening, the dollar print-wheel with the figure 5 at the line of print, and the dollar adding-wheel after it has moved to add 5 to the previous total. The swinging frame 20, 21 continues to move until it reaches its normal position in readiness for another movement. The 2-key is now depressed and the swinging frame 20, 21, is swung upward as before and the shaft 15 is advanced another step. By the first movement a recess $a$, in the first disk was carried beyond the head of its respective sliding pin $33^a$ so that the first arm $35^a$ and the indicator and print-wheel driven thereby will not be affected. A recess $b$ in the second disk $30^b$, however, was at the same time brought into the line of its respective pin $33^b$ so that in this second movement of the frame the notch 32 in the rib $31^b$ receives the dog $34^b$ when it reaches its position and carries the second arm $35^b$ upward to its extreme position, thereby bringing the second indicator and print-wheel backward to 0. The key 16 being then released from pressure is returned, together with the swinging frame 20, 21 as before.

In the upward movement of the key 16 the third finger 47, being of a proper relative length, is struck and shifted by the dog 18 so as to cause the second toothed bar $43^b$ to bring its third tooth into engagement with the end of the second lifting-finger $42^b$ and thereby to uncouple the arm $35^b$ from its actuator and stop the dime indicator with the figure 2 at the sight opening, the dime print-wheel with the figure 2 at the line of print, and the dime adding wheel after it has moved to add 2 to the previous total. The parts having again returned to normal position the 5-key is again depressed. The operation is the same as before save that as a recess $c$ in the third disk $30^c$ was brought into line with its respective sliding pin $33^c$ by the second movement to permit the coupling of the third arm $35^c$ to the swinging frame, the cent indicator, the cent print-wheel and the cent adding-wheel are operated while the others are not affected. During the last forward movement of the shaft 15 the print-hammer 60 is set by the cam-toothed disk 66 and on the return of the swinging frame 20, 21 to position the dog 64 on the arm 63 is knocked from the point of the cam 67 and the hammer 60 is actuated by its spring 69. Also during the forward movement of the shaft 15 the drawer 11 is unlocked by the same cam toothed disk 66 and the levers 72, 73, operated thereby, and is started forward. Finally, the last movement brings a recess $a$ in the first disk $30^a$ in line with its pin $33^a$ in readiness for another operation.

I have herein and in the claims used the term "register" or "cash register" with the general significance which is given to it in the trade, that is to say, as applicable to machines which simply indicate the value of the sale as well as to those which record or register the amount or print it upon a check or ribbon, and I do not intend that the use of such term or terms shall have any restrictive effect. Furthermore, although I have herein described my invention as embodied in a register provided with rotating indicator wheels, it is obvious that its broader features are no less applicable to registers having fixed dials and movable pointers or having tablets which are exposed by their own movement or by the movement of a screen.

I claim as my invention—

1. The combination of a single set of keys, an actuator operated by said keys, a series of indicators, a coupling between each indicator and said actuator, a series of cam disks advanced step by step by successive operations of the keys means operated by each of said disks to prevent or permit the engagement of the couplings with said actuator.

2. The combination of a single set of keys, an actuator operated by said keys, a series of indicators, a coupling between each indicator and said actuator, a series of pawl-pins carried by the actuator to permit or prevent the engagement of said couplings therewith, and a series of disks adapted to be advanced step by step by successive operations of the keys and to control the movements of said pins.

3. The combination of a single set of keys, a rotatable shaft upon which the keys are pivoted, an actuator operated by said keys, a series of indicators, a coupling between each indicator and the actuator, a series of pawl-pins carried by the actuator to permit or prevent the engagement of the couplings therewith, a pawl carried by the actuator, a ratchet-wheel fixed to said shaft and engaged by said pawl, and a series of cam disks mounted on said shaft to control said pawl-pins.

4. The combination of an indicator, a set of keys, an actuator operated by said keys, a gear for operating said indicator, a rack meshing with the gear, an automatic coupling between said rack and said actuator, and a series of fingers severally operated by said keys to control said coupling and determine the extent of movement of the indicator.

5. The combination of an indicator, a set of keys, an actuator operated by said keys and having a notch, an arm to operate said indicator, a dog carried by said arm to engage said notch and having a lifting finger, a toothed rib adapted to be moved to engage said lifting finger and raise the dog from the notch, and a series of fingers to control said rib and severally operated by said keys.

6. The combination of a set of keys, a swinging frame to which each of said keys may be coupled, a swinging arm carrying a rack, a pinion meshing with said rack, a rotating indicator driven by said pinion, a dog carried by said arm to engage said frame and having a releasing finger, a toothed rib adapted to be moved to engage said lifting finger, and a series of fingers severally operated by said keys to move said toothed rib into engagement with said finger.

7. The combination of a single set of keys representing different amounts, a series of print-wheels each common to said set of keys and representing corresponding amounts, means intermediate said keys and wheels for setting the latter in succession upon successive operations of any keys in the set, and a print-hammer actuated only by the last key operated and co-operating with said wheels to effect the printing.

8. The combination of a single set of keys representing different amounts, a series of print-wheels, each common to said set of keys and representing corresponding amounts, means intermediate said keys and wheels for setting the latter in succession upon successive operations of any keys in the set, a print-hammer co-operating with the wheels, and an actuating device for said hammer advanced step by step by the successive operations of the keys and operating to effect the printing at the end of a series of operations of the keys.

9. The combination of a single set of keys representing different amounts, a series of print-wheels each common to the keys of the set and representing corresponding amounts, means intermediate said keys and wheels for setting the latter in succession upon successive operations of any keys in the set, a print-hammer, a spring for throwing the same against the wheels to effect the printing, a rotary cam co-operating with the hammer to retract it against the resistance of its spring, and connections with the keys for advancing said cam step by step to cause it to retract and release the hammer at the end of a given number of operations of the keys.

10. The combination of a single set of keys, a series of print-wheels each common to said keys, an actuator operated by said keys, an automatic coupling between said print-wheels and said actuator whereby said print-wheels are coupled in succession to said actuator by successive operations of any of said keys, and a print-hammer actuated only by the last key operated and co-operating with said print-wheels.

11. The combination of a single set of keys, a series of print-wheels each common to said keys, an actuator operated by said keys, a series of coupling devices operated in succession by successive operations of any of said keys to couple said print-wheels in succession to said actuator, and a print-hammer actuated only by the last key operated and co-operating with the print-wheels.

12. The combination of a single set of keys, an actuator operated by said keys, a series of print-wheels, a coupling between each print-wheel and said actuator, a series of pawl-pins carried by said actuator to permit or prevent the engagement of the couplings with said actuator, a series of disks advanced step by step by the successive operations of any of said keys to control the movements of said pins, and a print-hammer.

13. The combination of a print-wheel, a set of keys, an actuator operated by said keys, a gear for operating said print-wheel, a coupling between said gear and said actuator, a series of fingers severally operated by said keys to control said coupling and determine the extent of movement of the print-wheel, and a print-hammer.

14. The combination of a single set of keys, a series of print-wheels operated in succession by successive operations of any of said keys, a print-hammer, a moving part advanced step by step by successive operations of said keys, and a cam carried by said moving part and adapted to operate said hammer at its last advance.

15. The combination of a single set of keys, an actuator operated by said keys, a series of print-wheels operated in succession by successive operations of said actuator, a print-hammer, a rotatable shaft, a ratchet-wheel fixed upon said shaft, a pawl carried by said actuator and engaging said ratchet-wheel, and a cam carried by said shaft and adapted to operate said hammer.

16. The combination of a single set of keys, a swinging frame operated by said keys, a series of print-wheels operated in succession by successive operations of said actuator, a spring-pressed print-hammer, a lever for moving said hammer and having a dog thereon, a rotatable shaft, a ratchet-wheel fixed upon said shaft, a pawl carried by said actuator and engaging said ratchet-wheel, a cam carried by said shaft and adapted to move said lever through said dog, and a pin carried by said swinging frame and adapted to knock said dog from said cam as the swinging frame returns to normal position.

17. The combination of a single set of keys, a series of indicators operated in succession by successive operations of said keys, a moving part advanced by successive operations of said keys, a drawer, and means actuated by said moving part to unlock said drawer at the last operation of said keys.

18. The combination of a single set of keys, a series of indicators operated in succession by successive operations of said keys, a moving part advanced step by step by successive operations of said keys, a cam carried by said moving part, a drawer, and a lock for said drawer operated by said cam.

19. The combination of a single set of keys, a series of indicators operated in succession by successive operations of said keys, a shutter for said indicators, and means actuated by said keys at the first operation to move said shutter to conceal the indicators and at the last operation to disclose the indicators.

20. The combination of a single set of keys, a series of indicators operated in succession by successive operations of said keys, a shutter for said indicators, a moving part advanced step by step by successive operations of said keys, and a cam carried by said moving part and controlling the movement of said shutter.

21. The combination of a single set of keys, a series of indicators operated in succession by successive operations of said keys, a swinging frame operated by said keys and bearing a pawl, a rotatable shaft having a ratchet-wheel engaged by said pawl, a cam carried by said shaft, and a shutter operated by said cam.

22. The combination of a set of keys, a rotatable shaft having a ratchet-wheel, a swinging frame operated by said keys and having a pawl to engage said ratchet-wheel, a cam carried by said shaft, a spring-pressed bell-hammer, an actuating lever therefor bearing a pivoted dog, and adapted to be set by the action of said cam upon said dog, and a pin or projection carried by said frame to knock said dog from said cam.

In testimony whereof I have signed my name to this specification in the presence of two subscribing witnesses.

CARL W. WEISS.

Witnesses:
A. N. JESBERA,
A. WIDDER.